United States Patent
Katou (10) Patent No.: US 8,265,869 B2
(45) Date of Patent: Sep. 11, 2012

(54) VEHICLE NAVIGATION APPARATUS AND VEHICLE NAVIGATION PROGRAM

(75) Inventor: Kiyohide Katou, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 719 days.

(21) Appl. No.: 12/285,990

(22) Filed: Oct. 17, 2008

(65) Prior Publication Data

US 2009/0138193 A1    May 28, 2009

(30) Foreign Application Priority Data

Oct. 30, 2007   (JP) .................................. 2007-281872

(51) Int. Cl.
*G01C 21/00* (2006.01)
(52) U.S. Cl. ....................................................... 701/431
(58) Field of Classification Search .................... None
See application file for complete search history.

(56) References Cited

U.S. PATENT DOCUMENTS

| | | | |
|---|---|---|---|
| 5,893,045 A | 4/1999 | Kusama et al. | |
| 6,385,536 B2 * | 5/2002 | Kimura | 701/209 |
| 6,466,866 B1 * | 10/2002 | Sato | 701/209 |
| 6,466,867 B1 * | 10/2002 | Sakashita | 701/211 |
| 6,466,868 B2 * | 10/2002 | Sakashita | 701/211 |
| 7,869,947 B2 * | 1/2011 | Schirmer et al. | 701/211 |
| 2003/0033080 A1 * | 2/2003 | Monde et al. | 701/201 |
| 2003/0072471 A1 * | 4/2003 | Otsuka et al. | 382/103 |
| 2005/0209748 A1 * | 9/2005 | Watanabe et al. | 701/23 |
| 2006/0009904 A1 | 1/2006 | Sakashita et al. | |
| 2006/0184321 A1 * | 8/2006 | Kawakami et al. | 701/209 |
| 2007/0021912 A1 * | 1/2007 | Morita et al. | 701/211 |
| 2007/0106460 A1 * | 5/2007 | Nakayama et al. | 701/201 |
| 2007/0106470 A1 * | 5/2007 | Nakayama et al. | 701/211 |
| 2009/0024320 A1 * | 1/2009 | Nakamura et al. | 701/210 |
| 2009/0210151 A1 * | 8/2009 | Toyoda | 701/208 |

FOREIGN PATENT DOCUMENTS

CN   1165950 A   11/1997
JP   A-2006-23159   1/2006

OTHER PUBLICATIONS

Chinese Patent Office, First Notification of Reason(s) for Refusal mailed Feb. 3, 2012 in Chinese Patent Application No. 200810169414.1 w/Partial English-language Translation.

* cited by examiner

*Primary Examiner* — James Trammell
*Assistant Examiner* — Truc M Do
(74) *Attorney, Agent, or Firm* — Oliff & Berridge, PLC (57) ABSTRACT

A vehicle navigation apparatus includes: a vehicle position information obtaining unit detecting a vehicle position; a special section detecting unit detecting a special section from a guidance route ahead of the vehicle position; a leading lane shift detecting unit detecting a shift of the vehicle from a main line to the leading lane in the special section; and a branch guiding unit conducting branch guidance for a branch point with a leading lane and conducting, in response to the detection of the shift of the vehicle into the leading lane detected by the leading lane shift detecting unit, travel guidance for a branch path.

10 Claims, 7 Drawing Sheets

VEHICLE NAVIGATION APPARATUS AND VEHICLE NAVIGATION PROGRAM

The disclosure of Japanese Patent Application No. 2007-281872 filed on Oct. 30, 2007 including the specification, drawings and abstract is incorporated herein by reference in its entirety. BACKGROUND OF THE INVENTION

1. Field of the Invention

The present invention relates to a vehicle navigation technique for performing travel guidance for a branch path to be a guidance target existing on a guidance route leading to a destination.

2. Description of the Related Art

There is known a navigation apparatus which detects a position of a vehicle using a GPS and the like, displays both a symbol indicating the position and a road map on a display, and informs travel guidance by displaying it on the display or by a voice in a timely manner so as to facilitate a smooth traveling along a set guidance route to a destination. For example, when a branch point for which the travel guidance should be performed approaches on the guidance route, guidance such as "Turn right at a next branch point" is conducted by displaying an arrow on the road map or by a voice. Such travel guidance for the branch point should be conducted in a timely manner while a vehicle is traveling in a predetermined distance zone before the branch point.

In a case where the branch points such as intersections exist in a short distance, if after a vehicle is confirmed to pass through a firstly located branch point and travel to a following branch point and then travel guidance for the following branch point is performed, it is impossible to provide enough time for driving to a driver, which is a problem. Accordingly, it is proposed, for a case where a lane change is necessary to correctly diverge at a branch point to travel after passing through a guidance intersection in which the guidance intersection and the branch point are located within a reference of predetermined distance along a guidance route, to precedingly perform a guidance to prompt to change the lane after passing through the guidance intersection before a vehicle enters the guidance intersection (for example, refer to Japanese Patent Application Publication No. JP-A-2006-23159 (paragraph number 0043, FIG. 2). In other words, this technique intends that when two consecutive branch points to be guided exist within a predetermined close distance, branch guidance for a preceding branch point is informed, and at the same time, branch guidance for a following branch point is also informed, thereby getting a driver to understand the travel guidance for the following branch point well in advance. However, when the travel guidance of the two branch points is simultaneously informed, the driver may be confused.

SUMMARY OF THE INVENTION

A branch path which diverges from a main line in an express way, a highway and the like is often provided with a leading lane being located before a branch point and extending substantially in parallel with the main line so that a divergence can be smoothly conducted, and a vehicle travels on the leading lane and then enters the branch path by passing through the branch point. At this time, when a next branch point, a tollgate or the like exists on the branch path in which the vehicle enters, travel guidance for the next branch point or the tollgate is conducted, or even if the branch point or the like does not exist, travel guidance such as "Please travel straight 10 km along the road" is conducted, and a driver travels in accordance with such travel guidance. However, because of a structure of map data used in a vehicle navigation apparatus, a position of a branch point with leading lane on the data is located ahead in a travel direction of an actual start point of the leading lane. Therefore, conventionally, after the vehicle passes through the branch point with leading lane on the data, travel guidance such as branch guidance for a next branch path is conducted. Specifically, in a related art, when a vehicle entering the leading lane and traveling thereon in order to enter the branch path passes through the branch point between the main line and the branch path which diverges from the main line, it is confirmed to travel on the branch path, and subsequently, travel guidance for a next branch point or the like located on the branch path is conducted, but, when the branch point with leading lane and a first branch point on the branch path are located in a close distance, for instance, travel guidance for the branch path is forced to be conducted in a very short period of time, which creates a problem that it is impossible to provide enough time for driving to a driver. Further, if the branch guidance for the preceding branch point is simultaneously informed with the branch guidance for the next branch point as described in Japanese Patent Application Publication No. JP-A2006-23159, in a travel route where a vehicle first shifts into a leading lane and enters an actual branch path after traveling on the leading lane and then diverges at a next branch point, if shift guidance for the leading lane as well as the branch guidance for the branch point on the branch path diverges from the main line are conducted, there is generated a problem that the contents of the precedingly conducted branch guidance may be forgotten when the vehicle shifts into the leading lane and travels thereon.

The present invention has been made to solve the aforementioned problems, and an object thereof is to provide a vehicle navigation technique capable of conducting travel guidance for a branch path in a special section having a branch point with leading lane and leading to the branch path by passing through the leading lane of a main line in an express way, a highway and the like, in an appropriate timing.

In order to attain the aforementioned object, a vehicle navigation system according to the present invention includes: a vehicle position information obtaining unit detecting a vehicle position; a guidance route calculating unit calculating a guidance route based on the vehicle position and a set destination; a special section detecting unit detecting a special section having a branch point with a leading lane through which the branch path diverges from a main line based on the guidance route ahead of the vehicle position; a leading lane shift detecting unit detecting a shift of the vehicle from the main line to the leading lane in the special section; and a branch guiding unit conducting branch guidance for the branch point with the leading lane and conducting, in response to the detection of the shift of the vehicle into the leading lane detected by the leading lane shift detecting unit, travel guidance for the branch path.

In the present application, "branch point" refers to a point where two or more roads meet so that the vehicle can advance in at least two directions, and includes a narrow-angle branch point, an intersection, and the like.

With this structure, when a vehicle diverges and travels in the special section which leads to the branch path by passing through the branch point with the leading lane through which the branch path diverges from the main line, as a preliminary step, at the time the vehicle shifts into the leading lane from the main line, the leading lane shift detecting unit detects the shift of the vehicle into the leading lane, and travel guidance for the branch path located ahead of the leading lane is conducted. Specifically, in response to the detection of the shift of the vehicle into an actual leading lane, the travel guidance for the branch path is conducted before the vehicle passes through the branch point with leading lane. This is based on the fact that a driver recognizes that he/she clearly travels toward the branch path or enters the branch path when the vehicle shifts into the leading lane from the main line although the vehicle is located before the actual branch point with leading lane, so that branch guidance for the branch point with leading lane is no longer necessary at this time, and even if branch guidance for the branch path in which the vehicle is about to enter, which is, for instance, branch guidance for a branch point which appears right after entering the branch path (close-distance branch point), guidance for a tollgate located on the branch path, and further, guidance to inform the driver to travel straight along the branch path, or the like is conducted, the driver can understand, without any confusion, the guidance is travel guidance for the branch path in which the vehicle is about to enter. Accordingly, particularly when the branch point with leading lane and a next guidance point on the branch path are located in a close distance, the travel guidance for the next branch path is conducted when the vehicle shifts into the leading lane, so that it is possible to provide clear travel guidance for the branch path to the driver well in advance.

The branch guiding unit performs the branch guidance for the branch point with the leading lane, and in response to the detection of the shift of the vehicle into the leading lane detected by the leading lane shift detecting unit, it performs the travel guidance for the branch path at a predetermined timing (by receiving a so-called trigger signal), and the travel guidance may be conducted at a timing from after the leading lane shift detecting unit detects the shift of the vehicle into the leading lane and until the vehicle position reaches the branch point with leading lane. This depends on the length of the leading lane, and by considering a tendency in which the driver feels that he/she already enters the branch path from the main line after traveling a certain distance on the leading lane, a point in time where the vehicle passes through at least the half of the leading lane is preferably set as a timing for conducting the travel guidance for the branch path.

The leading lane shift detecting unit detecting the shift of the vehicle from the main line into the leading lane of the special section can be realized by some different methods. Among them, one to be proposed as a preferable leading lane shift detecting unit in a case where a camera capable of including at least road lane markings in the vicinity of the vehicle in a shooting range is mounted on the vehicle is composed of an image recognition detecting section detecting the shift of the vehicle into the leading lane based on the constant detection of the road lane markings by the image recognition of the shot image from the camera. Here, "road lane markings" refer to solid or dashed white lines, yellow lines, and the like marked as border lines of the traffic lane on both sides or one side of the lane (traffic lane), and generally, the road lane markings of dashed lines are marked in the boundary between a traveling lane and the leading lane. Therefore, when the road lane markings at a left side of the traveling lane change from solid lines to dashed lines and the dashed lines go from left to right, for example, it is possible to detect from the image recognition that the vehicle shifts from the traveling lane into the leading lane at the left side. A presence of the leading lane and a positional relationship between the leading lane and the traveling lane can be known from map information and road information stored in the navigation apparatus, so that by using the image recognition technique as described above, it is possible to relatively easily detect the shift of the vehicle into the leading lane.

It is allowable that, without performing the leading lane shift detection by capturing the temporal change in the aforementioned lane marking images through the image recognition, a leading lane shift determination is performed through a pattern matching processing in which the leading lane shift detecting unit is formed of an image recognition detecting section detecting the shift of the vehicle into the leading lane based on types of the road lane markings obtained through the image recognition of the shot image from the camera, and a lane marking image when the vehicle is traveling on the leading lane is set as a standard pattern, for instance. In this case, compared to the technique for image-recognizing the temporal change, it is possible to save on a considerable amount of memory capacity temporarily storing a lot of shot images being received constantly.

The leading lane shift detection through the image recognition using the shot image from the camera may become impossible to be conducted depending on an environment such as snow. By considering such a case, or by considering a case where the leading lane shift detection is applied to a vehicle having no camera capable of including the road lane markings in the shooting range, it is also one of the preferred embodiments that the leading lane shift detecting unit includes a non-image recognition detecting section detecting the shift of the vehicle into the leading lane based on at least one signal among a direction detection signal, a steering operation signal and an indicator operation signal. The direction detection signal is generated from an output signal of a gyro, a geomagnetic sensor or the like, the steering operation signal is generated from an output signal of a sensor detecting a steering angle, and the indicator operation signal can be obtained from an indicator (direction indicator) control system. These signals are basically prepared in a general vehicle such as a passenger vehicle, so that they can be used without any special cost, which is advantageous. It is possible to estimate the shift of the vehicle into the leading lane by determining the presence of the leading lane and the positional relationship between the leading lane and the traveling lane from the map information and the road information, and based on, preferably, a plurality of combinations of the aforementioned signals. Further, by combining the aforementioned image recognition detecting section and the non-image recognition detecting section, a further reliable leading lane shift detecting unit can be configured.

As a preferred concrete configuration of the special section detecting unit, it is proposed to use a road information obtaining unit obtaining road information regarding the vicinity of the vehicle position which is originally provided to the vehicle navigation apparatus, and to detect the special section based on the road information.

The aforementioned technical characteristic of the vehicle navigation apparatus according to the present invention can be applied to a vehicle navigation method and a vehicle navigation program used in this vehicle navigation apparatus, and therefore, such a method and a program are also included in the scope of the right of the present invention. For instance, the vehicle navigation program according to the present invention causes a computer to execute the steps of detecting a vehicle position, calculating a guidance route based on the vehicle position and a set destination, detecting a special section having a branch point with a leading lane through which a branch path diverges from a main line based on the guidance route ahead of the vehicle position, detecting a shift of the vehicle from the main line to the leading lane in the special section, and conducting travel guidance for the branch path when the shift of the vehicle into the leading lane is detected. It is needless to say that the same operation and effect as those mentioned in the above-described vehicle navigation apparatus can be obtained in such a vehicle navigation program, and further, some additional techniques mentioned as embodiment examples of the vehicle navigation apparatus can also be applied to the vehicle navigation program.

DETAILED DESCRIPTION OF THE PREFERRED EMBODIMENTS

Before explaining a concrete configuration of a vehicle navigation apparatus according to the present invention, a basic principle thereof will be explained using a schematic view of FIG. 1.

Figure 1:
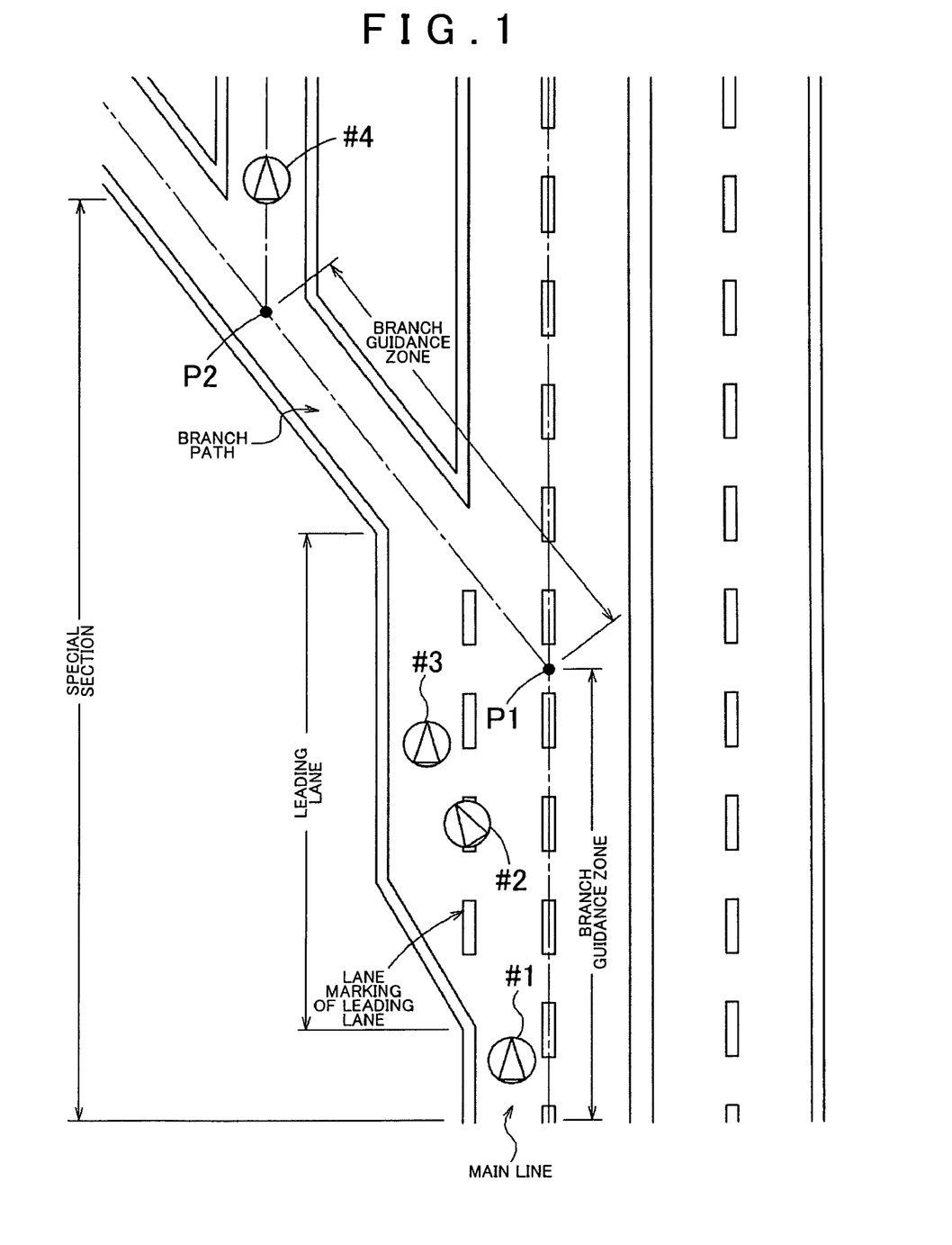
FIG. 1 is a schematic view to explain a basic principle of a vehicle navigation technique according to the present invention.

FIG. 1 shows a special section to be a target of a navigation processing according to the present invention having a branch point P1 with leading lane through which a branch path diverges from a main line in an express way, a highway and the like. Note that, in order to simply explain the present invention, it is supposed that on the branch path which diverges from the branch point P1 with leading lane in the special section, a branch point P2 exists within a predetermined close distance from the branch point P1 with leading lane (hereinafter, such a branch point is referred to as a close-distance branch point). Specifically, in an explanation of the basic principle of the invention, travel guidance when a section as shown in FIG. 1 in which a vehicle enters the branch path from the main line by passing through the leading lane and diverges in a specific direction at the close-distance branch point P2 located at a position right after entering the branch path exists in a part of a guidance route toward a predetermined set destination, is a main subject. Therefore, the close-distance branch point P2 can be replaced with a guidance point for providing guidance for a tollgate, a guidance point for notifying a simple caution when traveling on the branch path, or the like.

In an example of FIG. 1, several hundred m before the branch point P1 with leading lane correspond to a branch guidance zone for the branch point P1 with leading lane, and when a vehicle enters this zone, branch guidance such as "Please enter the leading lane at the left side" is conducted by a voice, a marking on a display, or by both of them (#01). In a prior art, after the vehicle enters the leading lane, passes through the branch guidance zone for the branch point P1 with leading lane, and enters a branch guidance zone for the close-distance branch point P2, branch guidance for the close-distance branch point P2, which is, "Please diverge in the right direction" is conducted, but, when a distance between the branch point P1 with leading lane and the close-distance branch point P2 is short, it becomes impossible to provide sufficient time to the driver for diverging at the close-distance branch point P2 to travel. Accordingly, in the present invention, a shift of the vehicle into the leading lane is detected by detecting that the vehicle crosses road lane markings (dashed lines) provided in a border line between the leading lane and the main line and enters the leading lane (#02), and the branch guidance for the close-distance branch point P2 is performed based on the detection of the shift into the leading lane as a trigger signal (#03). Accordingly, since the branch guidance for the close-distance branch point P2 is conducted before the vehicle passes through the branch point P1 with leading lane, compared to prior cases, the driver can smoothly diverge in the right direction at the close-distance branch point P2 with sufficient time (#04).

Figure 2:
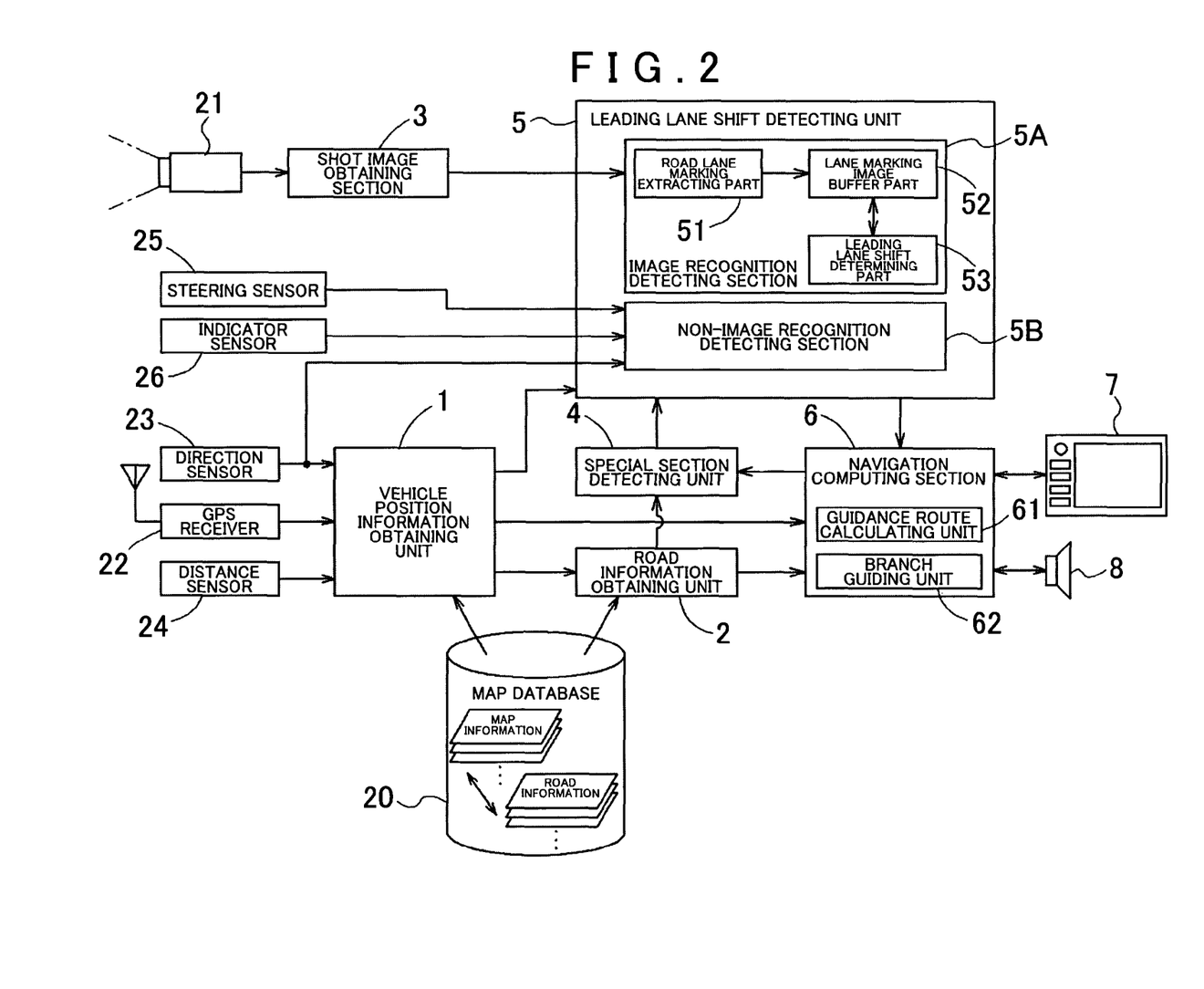
FIG. 2 is a functional block diagram of a vehicle navigation apparatus according to one embodiment of the present invention.

A functional block diagram showing an example of the vehicle navigation apparatus operating based on the aforementioned basic principle of the navigation processing is shown in FIG. 2. Respective functions of the vehicle navigation apparatus, concretely, a vehicle position information obtaining unit 1, a road information obtaining unit 2, a shot image obtaining section 3, a special section detecting unit 4 detecting the special section described in FIG. 1, a leading lane shift detecting unit 5, and a navigation computing section 6 are configured by being mounted as hardware or software (program), or as hardware and software, in a processor such as a CPU as a core member, for applying various kinds of processing to input data. Further, the map database 20 includes, as hardware configuration, a device having a recording medium capable of storing information and its driving unit, such as, for example, a hard disk drive, a DVD drive including a DVD-ROM, or a CD drive including a CD-ROM. Hereinafter, a configuration of each section of the navigation apparatus according to the present embodiment will be described in detail.

[Map Database]

Figure 3:
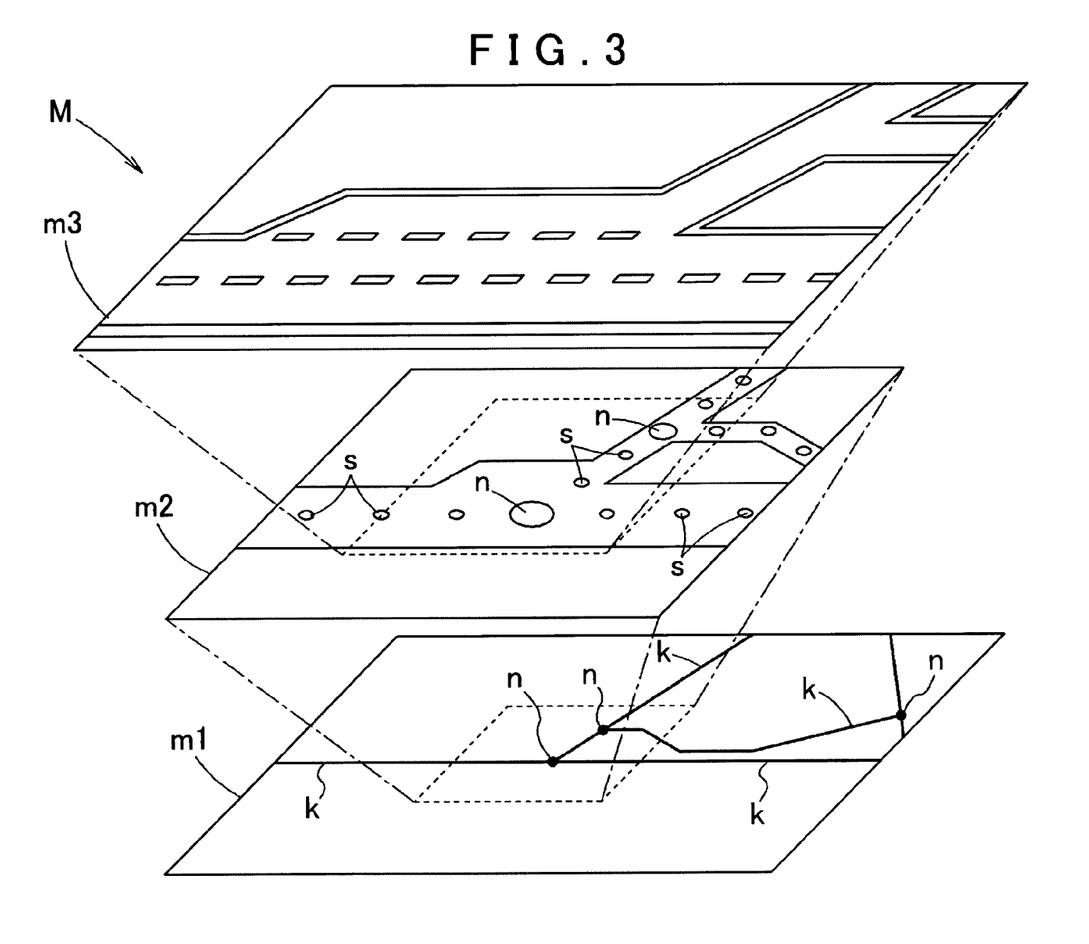
FIG. 3 is an explanatory view showing a structure of map information and road information stored in a map database.

The map database 20 stores a plurality of pieces of map information M, which are classified on a per predetermined area basis, and pieces of road information corresponding to these pieces of the map information M respectively. FIG. 3 is an explanatory view showing an example of the structure of the map information M and the road information which are stored in the map database 20. As shown in the drawing, the map database 20 stores a road network layer m1, a road shape layer m2, and a road information layer m3. In the present embodiment, pieces of information stored in these layers m1 to m3 respectively form the map information M, and among them, the information stored in the road information layer m3 forms the road information.

The road network layer m1 includes inter-road connection information. Concretely, the road network layer m1 includes: information on a large number of nodes n having map position information expressed by longitude and latitude; and information on a large number of links k each linking two nodes n to form a road. The node n connected to the link k which branches off is called a branch node or a branch point. Further, each of the links k has, as its link information, road type (type such as an expressway, a toll road, a national road, a prefecture road, or the like), and information on the length and the like of the link. Further, the road shape layer m2 is stored in correspondence to the road network layer m1 and shows the shape of each road. Concretely, the road shape layer m2 includes information on shape interpolation points s which are disposed between the two nodes n (on the link k) to indicate a detailed shape of each of the links k, information on a road width at each of the shape interpolation points s for showing a detailed shape of each road, and so on.

The road information layer m3 is formed in correspondence to the road network layer m1 and the road shape layer m2 and stores detailed information on each road. Examples of the information stored in the road information layer m3 are information on each branch point (a branch point with leading lane, a close-distance branch point and the like), lane information regarding each road (including a leading lane), and so on. Here, the lane information includes information on the number of lanes of each road, a lane width of each lane, a length of the leading lane, and the like. The lane information further includes information on a positional relationship of each lane in a plurality of roads branching off and meeting at the branch point and a connection relationship of these roads (link angle, substantially straight connection, and so on), and so on.

[Vehicle Position Information Obtaining Unit]

The vehicle position information obtaining unit 1 obtains vehicle position information indicating a vehicle position, that is, a current position of the vehicle. Here, the vehicle position information obtaining unit 1 is connected to a GPS receiver 22, a direction sensor 23, and a distance sensor 24. Here, the GPS receiver 22 receives GPS signals from a global positioning system (GPS) satellite. The GPS signal is normally received every one second and is output to the vehicle position information obtaining unit 1. The vehicle position information obtaining unit 1 analyses the signals received by the GPS receiver 22 from the GPS satellite, thereby capable of obtaining information regarding a current position (longitude and latitude), a travel direction, a moving speed, and the like of the vehicle. The direction sensor 23 detects the travel direction of the vehicle or a change in the travel direction. For example, the direction sensor 23 is formed by a gyro sensor, a geomagnetic sensor, an optical rotation sensor or a rotation-type resistance volume attached to a rotating portion of a steering handle, an angle sensor attached to a wheel portion, or the like. The direction sensor 23 outputs its detection result to the vehicle position information obtaining unit 1. The distance sensor 24 detects a speed and a moving distance of the vehicle. For example, the distance sensor 24 is formed by a vehicle speed pulse sensor outputting a pulse signal every predetermined rotation amount of a drive shaft, a wheel, or the like of the vehicle, a yaw/G sensor detecting acceleration of the vehicle, a circuit integrating the detected acceleration, and so on. The distance sensor 24 outputs information on the vehicle speed and the moving distance, which are its detection results, to the vehicle position information obtaining unit 1.

The vehicle position information obtaining unit 1 performs calculation for locating the vehicle by using a publicly known method based on the outputs from the GPS receiver 22, the direction sensor 23, and the distance sensor 24. Further, the vehicle position information obtaining unit 1 obtains, from the map database 20, the map information M regarding the vicinity of the vehicle position, and based on the map information M, performs correction for overlaying the vehicle position on a road shown in the map information by publicly known map matching. In this manner, the vehicle position information obtaining unit 1 obtains the vehicle position information including the information on the current position of the vehicle, which is expressed by longitude and latitude, and the information on the travel direction of the vehicle. The vehicle position information thus obtained includes an error ascribable to detection accuracy and the like of each of the sensors 22 to 24. The vehicle position information obtained by the vehicle position information obtaining unit 1 is output to the road information obtaining unit 2, the leading lane shift detecting unit 5, and the navigation computing section 6.

[Road Information Obtaining Unit]

The road information obtaining unit 2 obtains the road information including necessary parts of the map information from the map database 20 based on the vehicle position information and so on obtained by the vehicle position information obtaining unit 1. Specifically, the road information obtaining unit 2 obtains the road information including the special section to be a target of detection in the special section detecting unit 4, and outputs to the special section detecting unit 4. Further, the road information obtaining unit 2 obtains, from the map database 20, the map information M regarding an area requested by the navigation computing section 6 for use in the navigation processing by the navigation computing section 6, and outputs to the navigation computing section 6.

[Shot Image Obtaining Section]

A shot image obtaining section 3 obtains a shot image in the vicinity of the vehicle position output from a camera 21, and performs a necessary preprocessing such as a distortion correction and a density correction on the obtained shot image. The camera 21 includes a lens optical system and an image sensor, and is provided at a position where it is capable of shooting at least road lane markings in the vicinity of the vehicle. As such a camera 21, a back camera or the like which is included in the vehicle either as standard or optional equipment is suitably used, for instance. Note that the shot image obtaining section 3 receives the shot images from the camera 21 at predetermined time intervals, which are, for example, about 10 ms to 50 ms, and after performing the preprocessing on the shot images, it sends them to the leading lane shift detecting unit 5 and a display unit for monitoring peripheral region which is not shown here.

[Special Section Detecting Unit]

A special section detecting unit 4 detects the special section having the branch point with the leading lane through which the branch path diverges from the main line based on a guidance route extending in a forward direction of the vehicle position based on the road information sent from the road information obtaining unit 2 and the guidance route to a destination sent from the navigation computing section 6, and notifies the leading lane shift detecting unit 5 that the vehicle enters the special section. The special section starts before a start point of the leading lane and ends at the branch point with leading lane or a travel guidance point such as a first branch point on the branch path starting from the branch point with leading lane (close-distance branch point). If the accurate start point of the leading lane is unclear from the road information, it is possible to regard a point located a certain distance before the branch point with leading lane (rearward in the travel direction) as the start point of the leading lane.

[Leading Lane Shift Detecting Unit]

Upon receiving the notification from the special section detecting unit 4 that the vehicle enters a certain special section, the leading lane shift detecting unit 5 starts its operation, and detects that the vehicle crosses the leading lane in the special section from the main line to enter therein and travels on the leading lane and that the vehicle shifts to the travel on the leading lane. In this embodiment, the leading lane shift detecting unit 5 includes an image recognition detecting section 5A detecting the shift of the vehicle into the leading lane based on the constant detection of the road lane markings by the image recognition of the shot image from the camera, and a non-image recognition detecting section 5B being used as an auxiliary when the image recognition detecting section 5A does not sufficiently function due to an environmental condition and the like and detecting the shift of the vehicle into the leading lane based on at least one signal among a direction detection signal, a steering operation signal and an indicator operation signal.

The image recognition detecting section 5A determines the positional relationship between the leading lane and the main line in the special section to be a target to be processed based on image information sent from the shot image obtaining section 3 via the special section detecting unit 4, and detects that the vehicle turns toward the leading lane, crosses the leading lane and starts traveling thereon by performing an image recognition processing on the shot image obtained by the shot image obtaining section 3. Therefore, there are provided a road lane marking extracting part 51 which performs binarization processing, edge detection processing, and the like on the shot image received from the shot image obtaining section 3 to generate a lane marking image indicating a contour of the road lane marking included in the shot image, a lane marking image buffer part 52 which temporarily stores the generated lane marking images in a temporal order, and a leading lane shift determining part 53 which compares the lane marking images stored constantly in the lane marking image buffer part 52 to determine a motion vector from the lane marking image, for instance, to thereby finally determine that the vehicle shifts into the leading lane.

The non-image recognition detecting section 5B detects the shift into the leading lane from the main line in the special section by using an event which can be occurred when the vehicle shifts into the leading lane, which is, an operation pattern of the indicator operation, an operation pattern of the steering operation, or a change pattern of the travel direction. At this time, when the main line of the special section includes two lanes or more, in order to distinguish a lane change on the main line from the shift into the leading lane from the main line, there is a need to recognize a current lane position. The current lane position can be determined by the lane marking image of the road lane marking extracting part 51 obtained when the image recognition detecting section 5A normally functions. However, if it is desired that the non-image recognition detecting section 5B be operated completely independently from the image recognition detecting section 5A, the current lane position is determined by applying a method in which a number pattern of the lane changes in the right or left direction is analyzed, to thereby narrow down the possibilities of the lane position, and the like. Further, it is guided, before the special section, to travel in the direction where the leading lane exists (right direction or left direction), so that it is possible to determine the current lane position is a lane of the main line at a side where the leading lane exists based on whether the vehicle changes lane or travels on the same lane after the guidance.

[Navigation Computing Section]

The navigation computing section 6 is a processor operating according to an application program installed in order to execute navigation functions such as vehicle position display, route search from a place of departure to a destination, course guidance to the destination, and destination search. For example, the navigation computing section 6 performs processing such as obtaining the map information regarding the vicinity of the vehicle which is obtained from the map database 20 by the road information obtaining unit 2, and then displaying an image of a map on a liquid crystal display 71 of an operation panel 7 and displaying a vehicle position mark (symbol) on the image of the map in an overlaid manner, based on the vehicle position information. Further, the navigation computing section 6 performs the course guidance including branch guidance by using one of or both of the liquid crystal display 71 and an audio output device 8 such as a speaker based on the departure-to-destination guidance route calculated by a publicly known method and the vehicle position information. Accordingly, for the functions regarding especially to the present invention realized by the execution of the application program, a guidance route calculating unit 61 and a branch guiding unit 62 can be cited. Examples of the travel guidance regarding especially to the present invention conducted by the branch guiding unit 62 through the liquid crystal display 71 and the audio output device 8 are "Please go in the right direction at a branch 50 m ahead", "Please travel straight 10 km along the road", "There is a tollgate in 200 m, the charge is xx yen", and the like.

Figure 4:
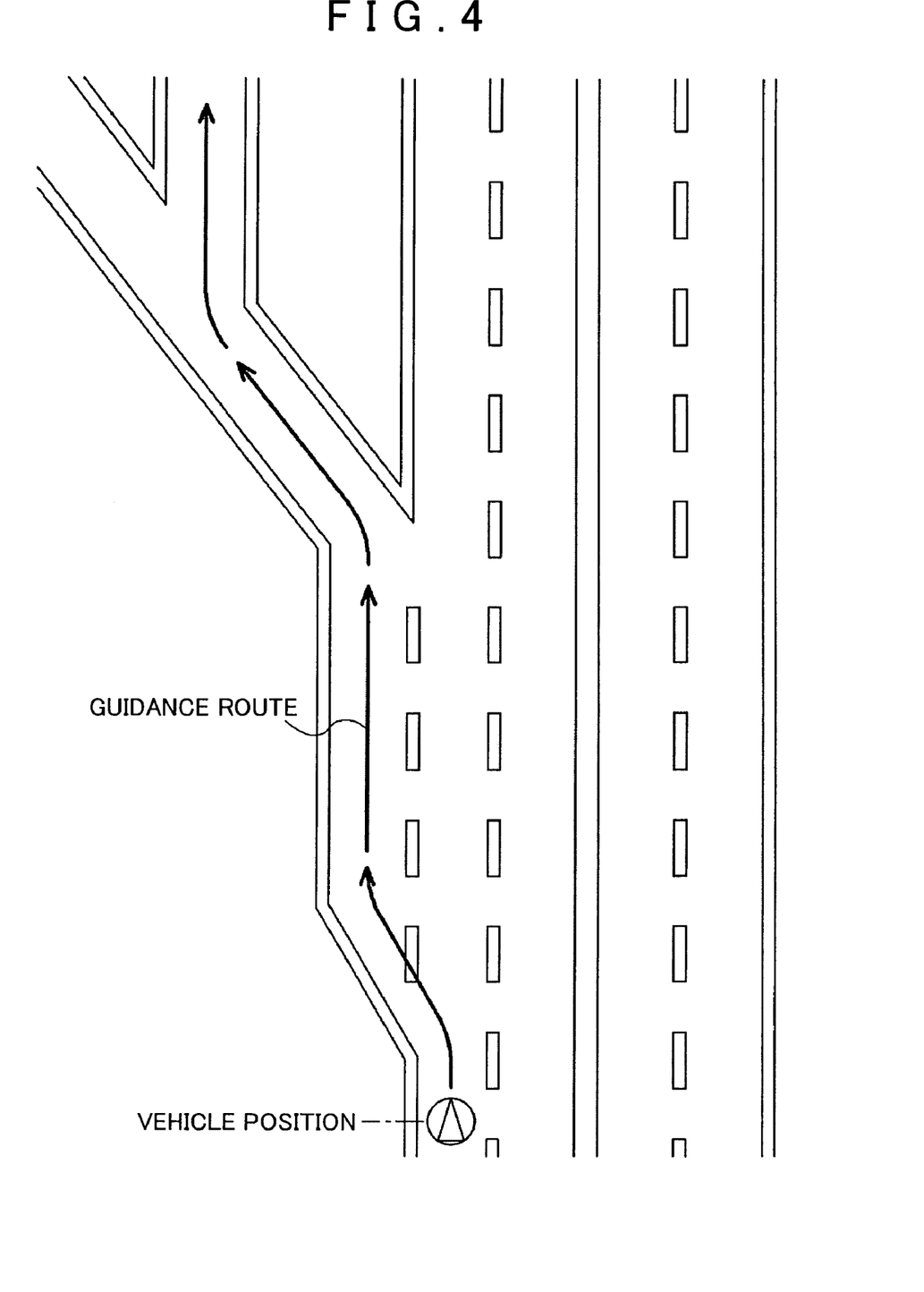
FIG. 4 is a view of travel guidance showing an example of a special section to be a target of a branch guidance processing according to the present invention.

A branch guidance processing in the vehicle navigation apparatus configured as above will be described using flow charts shown in FIG. 5 and FIG. 6 in which a special section having a close-distance branch path located at a position right after entering the branch path which diverges from the branch point with leading lane shown in FIG. 4 is used as an example. Therefore, the travel guidance for the branch path is branch guidance for the close-distance branch path.

As a first operation of the vehicle navigation apparatus, the guidance route calculating unit 61 calculates a guidance route to a destination based on the destination input through the operation panel 7 (#11). This guidance route is always referred to in a travel guidance processing such as branch guidance. When the travel is started, the vehicle position information obtaining unit 1 obtains the vehicle position information obtained by the GPS receiver 22 and the like (#12). Next, road information including map information within a predetermined distance in a travel direction of the vehicle is obtained from the map database 20 based on the vehicle position information (#13). The road information obtained here includes information regarding a position of lane marking, a position of branch point, a presence/absence of leading lane, and the like. Based on the road information, the special section detecting unit 4 detects a presence/absence of the special section in which both a branch point with a leading lane through which a branch path diverges from a main line and a close-distance branch point located on the branch path continued from the leading lane and within a predetermined distance (several tens m to 100 m, for instance) from the branch point with leading lane exists in the guidance route ahead of the vehicle position (#14).

When the special section is not detected in the special section detection processing in step #14 (#15 No branch), it is checked whether or not normal travel guidance has to be conducted, and when there is a need to do it (#16 Yes branch), a publicly known normal travel guidance processing is conducted (#17). When there is no need to conduct the normal travel guidance (#16 No branch) and when the normal travel guidance processing is completed, it is checked whether or not navigation by the vehicle navigation apparatus is stopped (#30), and as long as it is not stopped (#30 No branch), the processing goes back to step #12 again, and the processing is repeated.

When the special section is detected in the special section detection processing in step #14 (#15 Yes branch), a special section guidance processing being a characteristic of the present invention is conducted. First, a leading lane shift guidance to inform a driver to shift into the leading lane is performed (#21), and a leading lane shift detection processing shown in FIG. 6 is started (#22).

Figure 6:
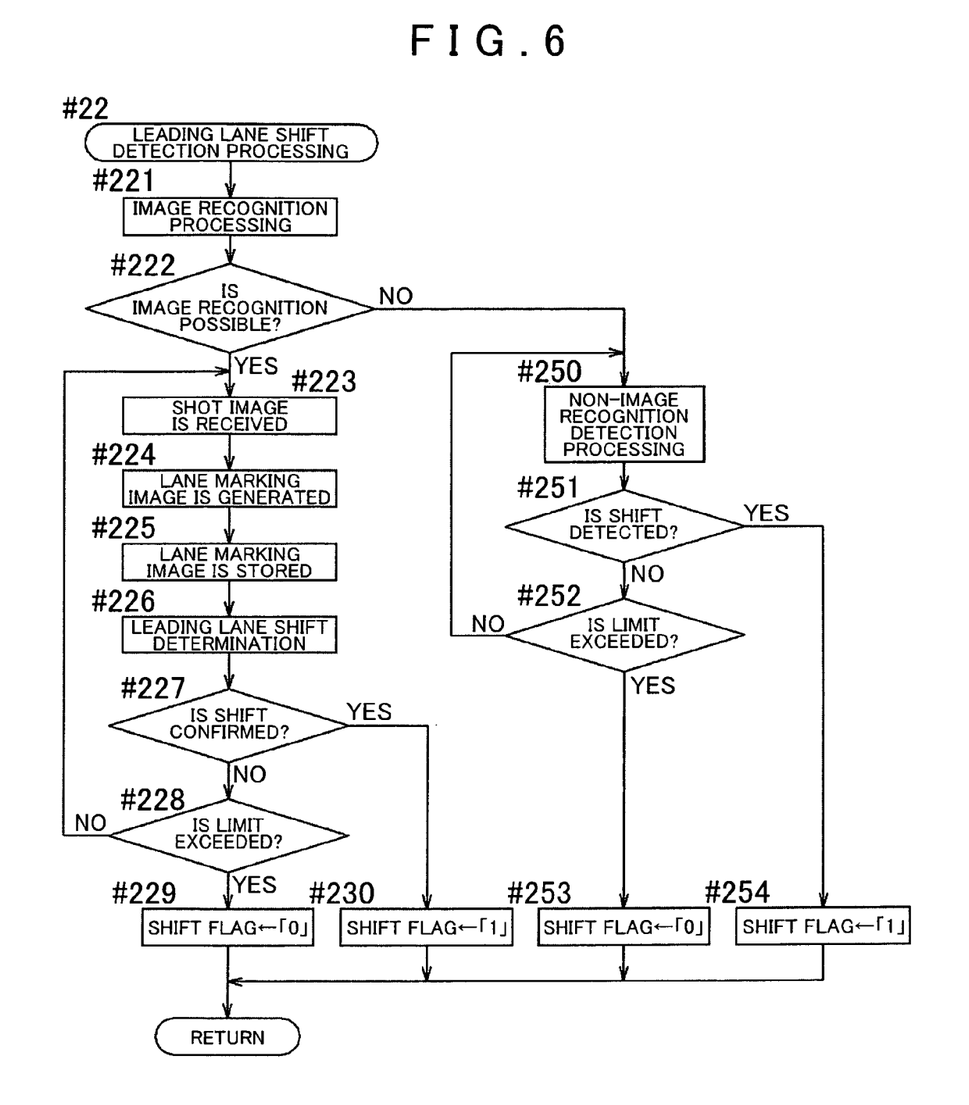
FIG. 6 is a flow chart showing an example of a leading lane shift detection processing according to the present invention.
Figure 7A:
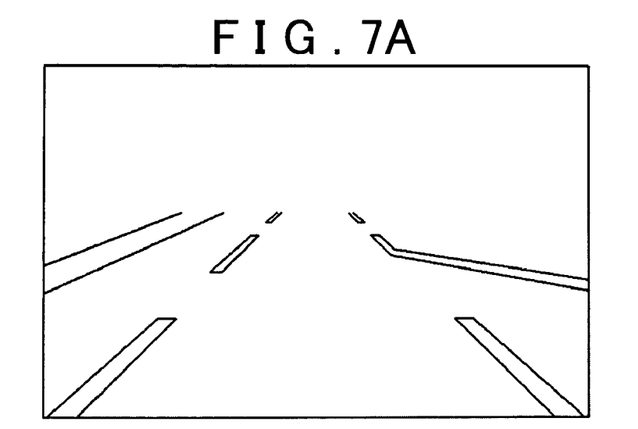
FIGS. 7(A), 7(B) and 7(C) are views showing examples of shot images of a rearward of a vehicle which is traveling in the special section.
Figure 7B:
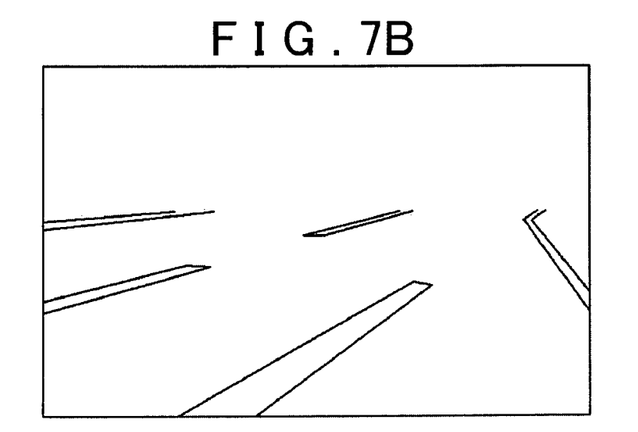
Figure 7C:
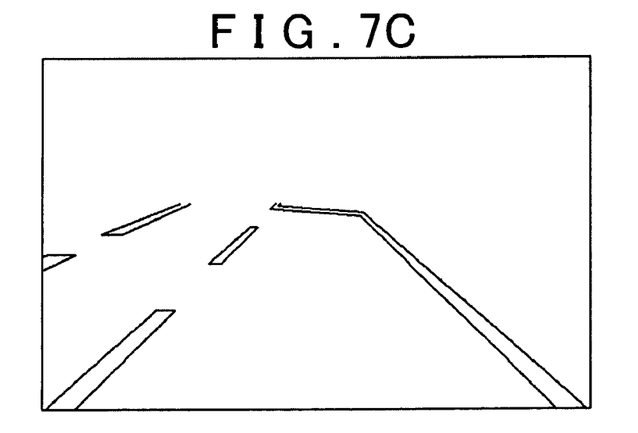

In the leading lane shift detection processing, a processing by the image recognition detecting section 5A is given priority over a processing by the non-image recognition detecting section 5B, so that it is first checked whether or not the image recognition processing using a back camera 21 disposed on a rear part of the vehicle and shooting a rearward of a vehicle body is possible (#221). The check is performed based on an operating state of the camera 21, an image quality state of the shot image from the camera 21, and the like. When the image recognition processing is possible (#221 Yes branch), the shot image is first received from the shot image obtaining section 3 (#223), and the road lane marking extracting part 51 extracts the road lane markings including the border line of the leading lane to generate the lane marking images (#224). The generated lane marking images are accumulated in the lane marking image buffer part 52 which temporarily stores about 10 pieces of the lane marking images in a first-in-first-out system (#225). Examples of the lane marking images generated from the shot image of a rearward of the vehicle and stored while the vehicle is traveling in the special section are shown in FIGS. 7(A) to 7(C). Further, the leading lane shift determining part 53 determines whether or not the vehicle shifts into the leading lane by paying attention to the movement and the position of the road lane markings while referring to the lane marking images accumulated constantly in the lane marking image buffer part 52 (#226). For instance, the lane marking image shown in FIG. 7(A) indicates a state where the vehicle is traveling on the main line close to leading lane, the lane marking image shown in FIG. 7(B) indicates a state where the vehicle is traveling while crossing the leading lane, and the lane marking image shown in FIG. 7(C) indicates a state where the vehicle shifts into the leading lane from the main line and is traveling on the leading lane. By distinguishing such lane marking images which change with time, the shift of the vehicle into the leading lane is determined.

Next, the determination result of the leading lane shift determining part 53 is checked, and when the shift of the vehicle into the leading lane is confirmed (#227 Yes branch), "1" is substituted into a shift flag (#230) and returned. When the shift of the vehicle into the leading lane is not confirmed (#227 No branch), it is further checked whether or not a limit which is set by a distance or time is over by setting a passing of the branch point with leading lane as a reference (#228). In this check, if it is regarded that the limit is exceeded, namely, if it is regarded that the branch point with leading lane is passed, (#228 Yes branch), "0" is substituted into the shift flag (#229) and returned. When the limit is not exceeded in the check in step #228 (#228 No branch), the processing goes back to step #223, and the image recognition processing is conducted by receiving further shot images.

When the image recognition processing is regarded as impossible in the check in step #221 (#221 No branch), the leading lane shift detection processing by the non-image recognition detecting section 5B is conducted (#250). The non-image recognition detecting section 5B detects and confirms the shift of the vehicle into the leading lane by detecting that the vehicle changes its course toward the leading lane and thereafter returns the course toward an extending direction of the leading lane based on at least one signal among a direction detection signal from the direction sensor 23, a steering operation signal from the steering sensor 25, and an indicator operation signal from the indicator sensor 26. When it is checked whether or not the shift into the leading lane is confirmed (#251) and when the vehicle is confirmed to shift into the leading lane (#251 Yes branch), "1" is substituted into the shift flag (#254) and returned. Also, when the shift of the vehicle into the leading lane is not confirmed (#251 No branch), whether the limit is exceeded or not is checked (#252), and when the limit is exceeded (#252 Yes branch), "0" is substituted into the shift flag (#229) and returned, and when the limit is not exceeded (#252 No branch), the processing goes back to step #250 and the leading lane shift detection processing by the non-image recognition detecting section 5B is continued.

Figure 5:
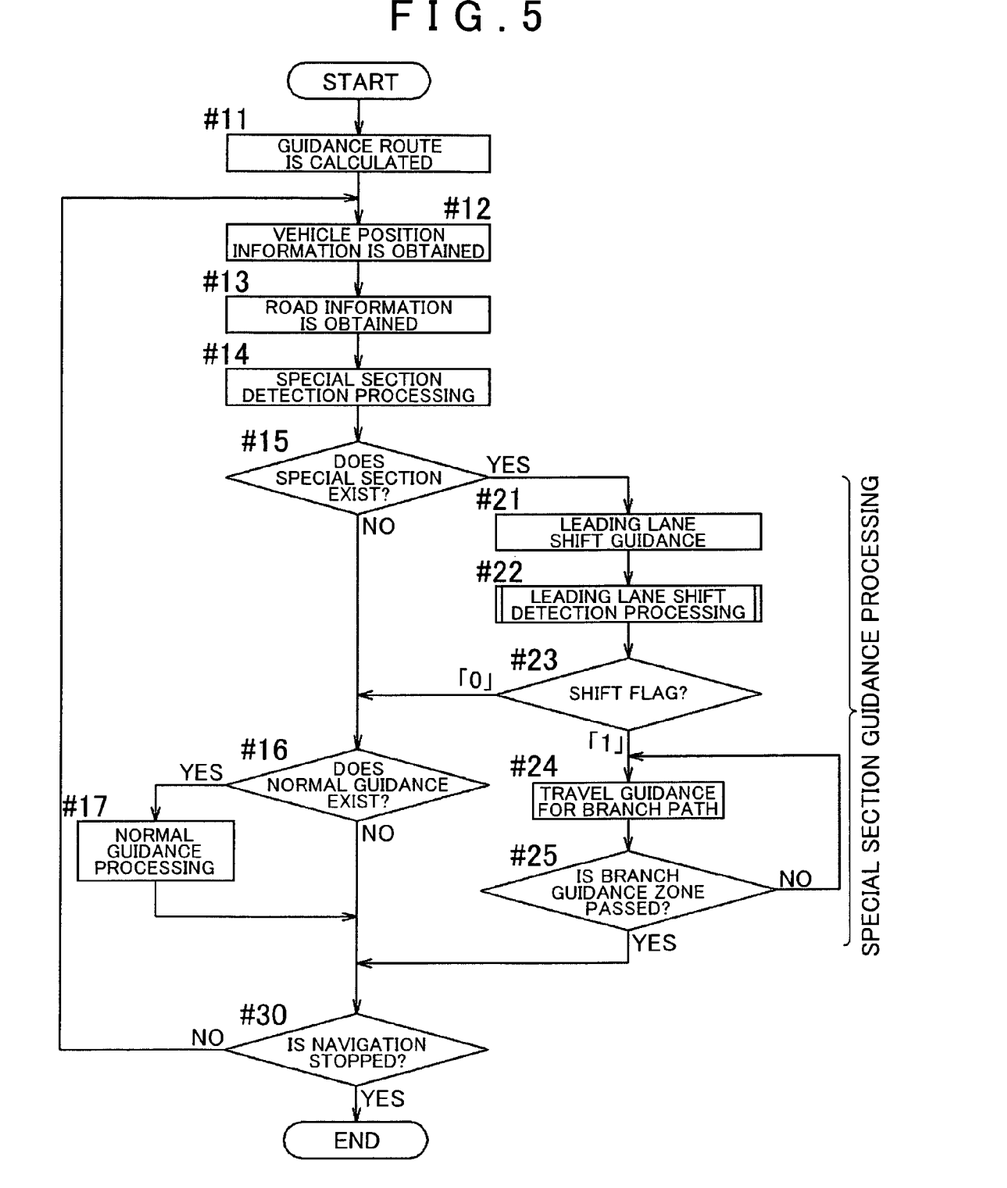
FIG. 5 is a flow chart showing an example of the branch guidance processing in the vehicle navigation apparatus according to the present invention.

When the aforementioned leading lane shift detection processing is completed and returned, the value of the shift flag is checked (#23) (refer to FIG. 5). When the value of the shift flag is "0", it means that the shift of the vehicle into the leading lane is not confirmed, so that the processing jumps to step #16 to shift to the processing of normal travel guidance. When the value of the shift flag is "1", it means that the shift of the vehicle into the leading lane is confirmed, so that the branch guidance for the close-distance branch point being a next branch point is triggered (#24). This branch guidance is performed until the vehicle passes through a branch guidance zone for the close-distance branch point, and when the vehicle passes through the branch guidance zone for the close-distance branch point (#25 Yes branch), it is regarded that the guidance processing of the special section is completed, so that the processing shifts to step #30 and a next travel guidance processing is performed, if necessary.

In the aforementioned guidance processing of the special section, the branch guidance for the close-distance branch point existing on the branch path continued from the leading lane is conducted when the vehicle shifts into the leading lane from the main line and before it substantially reaches the branch point with leading lane, so that even if the distance between the branch point with leading lane and the close-distance branch point is short, the driver can smoothly and correctly diverge at the close-distance branch point.

[Other Embodiments]

Other embodiments of the present invention will be described.

(1) The image recognition detecting section 5A of the aforementioned embodiment performs the leading lane shift determination by using a temporal change of the lane marking images, but, a determination algorithm other than that can also be applied. For instance, it is possible to configure the leading lane shift determining part 53 so that it performs the leading lane shift determination through a pattern matching processing by setting, for example, the lane marking image when the vehicle is traveling on the leading lane as a standard pattern based only on the shape (pattern) of the lane marking image shown in FIG. 7(C). In such a case, the lane marking image buffer part 52 is required to store only the latest lane marking image and the standard pattern. However, there is a need to prepare various types of standard patterns in accordance with the types of the leading lanes.

(2) In the aforementioned embodiment, the leading lane shift detecting unit 5 includes both the image recognition detecting section 5A and the non-image recognition detecting section 5B, but, it may be configured by only one of them. It is also possible that the priority between the image recognition detecting section 5A and the non-image recognition detecting section 5B is not provided, and a reliability is given to the results of the leading lane shift detection obtained from the both, in which the detection result with higher reliability is adopted.

(3) The leading lane according to the present invention refers to a lane which continues only to a branch path which branches diverges from a branch point, and a right-turn dedicated lane, a left-turn dedicated lane and the like, for instance, are also included in the scope of the construction of the leading lane.

A technique according to the present invention is applicable to a navigation system which performs branch guidance, in a guidance route which leads to a branch path having a next branch point by passing through a leading lane from a main line in an express way, a highway and the like, to get a driver to diverge at the next branch point with sufficient time.

What is claimed is:

1. A vehicle navigation apparatus, comprising:
a vehicle position information obtaining unit that detects a vehicle position;
a guidance route calculating unit that calculates a guidance route based on the vehicle position and a set destination;
a special section detecting unit that detects a special section based on the guidance route ahead of the vehicle position, the special section having a branch point with a leading lane through which a branch path diverges from a main line, the leading lane only permitting travel to the branch path;
a leading lane shift detecting unit that detects a shift of the vehicle from the main line to the leading lane in the special section; and
a branch guiding unit that:
performs branch guidance for the branch point with the leading lane when the special section is detected by the special detection section detecting unit; and
performs, in response to the detection of the shift of the vehicle into the leading lane detected by the leading lane shift detecting unit, travel guidance for a next branch point located on the branch path further along the guidance route.

2. The vehicle navigation apparatus according to claim 1, wherein:
the branch guiding unit performs the travel guidance for the branch path after the leading lane shift detecting unit detects the shift of the vehicle into the leading lane and until the vehicle position reaches the branch point with the leading lane.

3. The vehicle navigation apparatus according to claim 1, wherein:
the leading lane shift detecting unit comprises an image recognition detecting section that detects the shift of the vehicle into the leading lane based on a constant detection of road lane markings by an image recognition of an image from a camera.

4. The vehicle navigation apparatus according to claim 1, wherein:
the leading lane shift detecting unit comprises an image recognition detecting section that detects the shift of the vehicle into the leading lane based on a type of road lane marking detected by an image recognition of an image from a camera.

5. The vehicle navigation apparatus according to claim 1, wherein:
the leading lane shift detecting unit comprises a non-image recognition detecting section that detects the shift of the vehicle into the leading lane based on at least one signal among a direction detection signal, a steering operation signal and an indicator operation signal.

6. The vehicle navigation apparatus according to claim 3, wherein:
the leading lane shift detecting unit comprises a non-image recognition detecting section that detects the shift of the vehicle into the leading lane based on at least one signal among a direction detection signal, a steering operation signal and an indicator operation signal.

7. The vehicle navigation apparatus according to claim 4, wherein:
the leading lane shift detecting unit comprises a non-image recognition detecting section that detects the shift of the vehicle into the leading lane based on at least one signal among a direction detection signal, a steering operation signal and an indicator operation signal.

8. The vehicle navigation apparatus according to claim 1, further comprising:
a road information obtaining unit obtaining road information regarding the vicinity of the vehicle position, wherein
the special section detecting unit detects the special section based on the road information.

9. A non-transitory computer-readable storage medium storing a computer-executable vehicle navigation program, the program comprising:
instructions for detecting a vehicle position;
instructions for calculating a guidance route based on the vehicle position and a set destination;
instructions for detecting a special section based on the guidance route ahead of the vehicle position, the special section having a branch point with a leading lane through which a branch path diverges from a main line, the leading lane only permitting travel to the branch path;
instructions for detecting a shift of the vehicle from the main line to the leading lane in the special section;
instructions for performing branch guidance for the branch point with the leading lane when the special section is detected; and
instructions for performing, in response to the detection of the shift of the vehicle into the leading lane, travel guidance for a next branch point located on the branch path further along the guidance route.

10. A vehicle navigation method, comprising:
detecting a vehicle position;
calculating a guidance route based on the vehicle position and a set destination;
detecting a special section based on the guidance route ahead of the vehicle position, the special section having a branch point with a leading lane through which a branch path diverges from a main line, the leading lane only permitting travel to the branch path;
detecting a shift of the vehicle from the main line to the leading lane in the special section;
performing branch guidance for the branch point with the leading lane when the special section is detected; and
performing, in response to the detection of the shift of the vehicle into the leading lane, travel guidance for a next branch point located on the branch path further along the guidance route.

* * * * *